(12) United States Patent
Luoma

(10) Patent No.: US 6,795,692 B2
(45) Date of Patent: Sep. 21, 2004

(54) METHOD AND APPARATUS FOR TRANSMITTING INFORMATION BY RADIO

(75) Inventor: Ari-Matti Luoma, Laitila (FI)

(73) Assignee: Sonera Oyj, Helsinki (FI)

( * ) Notice: Subject to any disclaimer, the term of this patent is extended or adjusted under 35 U.S.C. 154(b) by 633 days.

(21) Appl. No.: 09/730,459

(22) Filed: Dec. 5, 2000

(65) Prior Publication Data

US 2001/0003704 A1 Jun. 14, 2001

Related U.S. Application Data

(63) Continuation of application No. PCT/FI99/00487, filed on Jun. 4, 1999.

(30) Foreign Application Priority Data

Jun. 5, 1998 (FI) .................................................. 981294

(51) Int. Cl.$^7$ ............................... H04B 1/02; H04B 1/66
(52) U.S. Cl. ....................... 455/102; 455/104; 455/109; 455/110
(58) Field of Search ............................. 455/42, 45, 46, 455/47, 48, 93, 102, 103, 104, 108, 109, 110; 375/300, 301, 302; 332/117, 120, 149, 167, 170

(56) References Cited

U.S. PATENT DOCUMENTS

| | | | |
|---|---|---|---|
| 4,124,779 A | * | 11/1978 | Berens et al. .................. 381/16 |
| 4,511,864 A | | 4/1985 | De Rivieré |
| 4,686,705 A | * | 8/1987 | Smith .......................... 455/109 |
| 4,852,086 A | | 7/1989 | Eastmond et al. |

FOREIGN PATENT DOCUMENTS

WO     WO 99/65200     12/1999

\* cited by examiner

*Primary Examiner*—Nguyen T. Vo
(74) *Attorney, Agent, or Firm*—Cohen, Pontani, Lieberman & Pavane

(57) ABSTRACT

The invention provides an apparatus and procedure for radio transmission of information using a middle channel, a first side channel and a second side channel. The transmitted middle channel is FM-modulated by a suitable frequency. A signal symmetrically amplitude-modulated with respect to the center frequency of the middle channel is generated, and a first amplitude-modulated single side band (LSB) and a second amplitude-modulated single side band (USB) are formed from the amplitude-modulated signal. The first single side band (LSB) is modulated by the information in the first side channel to form two side bands for the first single side band, and the second single side band (USB) is modulated by the information in the second side channel to form two side bands for the second single side band. The middle channel FM signal, the modulated first single side band (SSB) and the second modulated single side band (SSB) are then combined in a combiner for simultaneous transmission of all three channels.

11 Claims, 1 Drawing Sheet

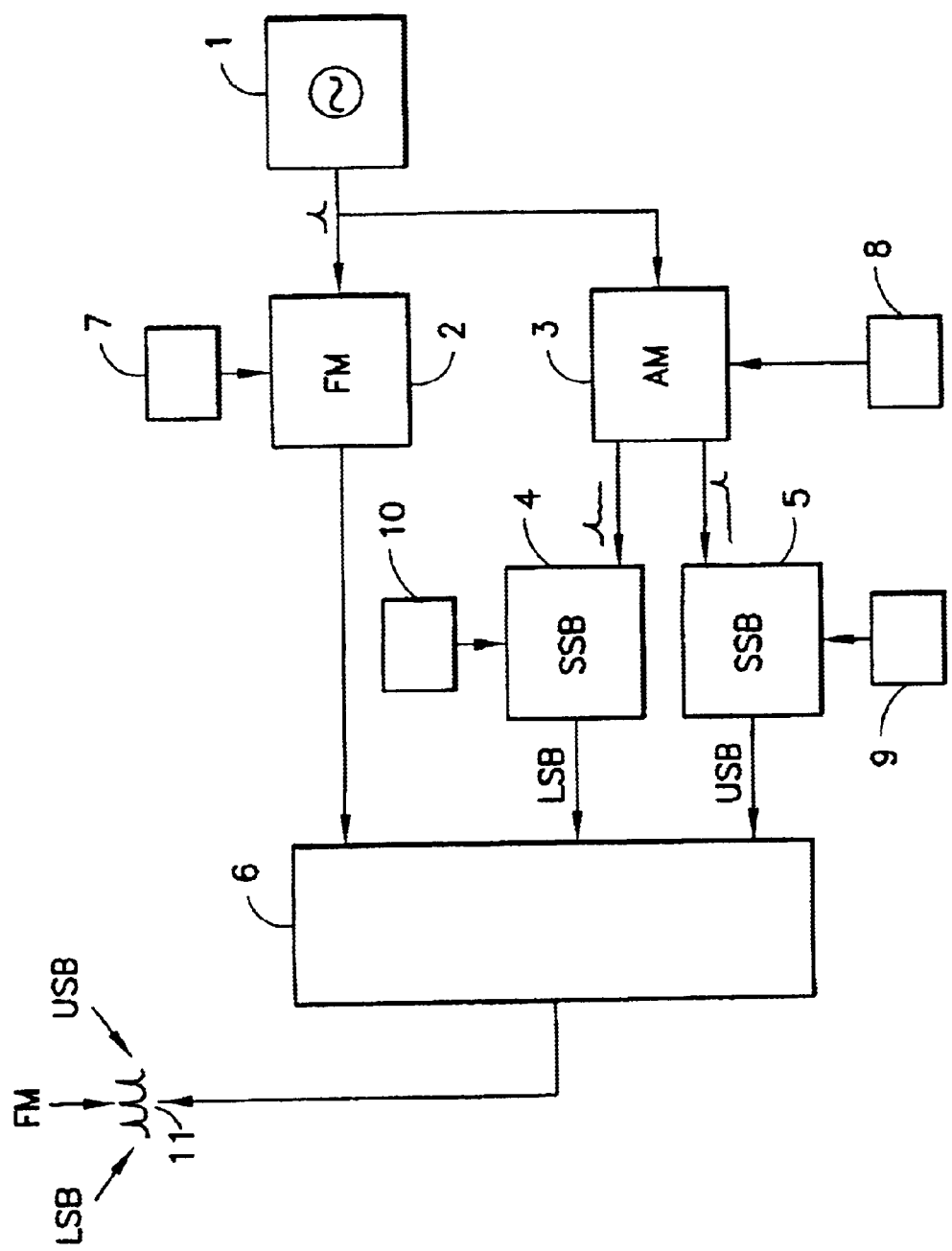

METHOD AND APPARATUS FOR TRANSMITTING INFORMATION BY RADIO

This a continuation of PCT Application No. PGT/FI99/00487, filed on Jun. 4, 1999, which claims priority from Finland Application No. FI 981294, filed Jun. 5, 1998.

BACKGROUND OF THE INVENTION

1. Field of the Invention

The present invention relates to a method and apparatus for the transmission of information by radio using a middle channel, a first side channel and a second side channel in a radio system.

2. Description of Related Art

The term electronic location and tracking refers to systems which can be used to locate and, if necessary, to follow a desired object as it moves with predetermined degree of accuracy and within a desired geographic field or area or extent by using radio transmission and receiving methods. One application in which such location service is a desired property is the national safety service network called SafeNet. The principle functions of SafeNet are the transfer and routing of supervisory information, the adaptation of different safety systems and networks for integrated utilization, and the establishment of a simple user interface to provide access to different telecommunication services needed in the safety sector. SafeNet has been designed to provide standard interfaces for the most common object-under-surveillance systems and to combine, in the same service network, the telecommunication services needed by the operative functional units. The radio communication must be encrypted and must be able to provide a sufficient data transmission capacity for SafeNet purposes and properties.

SUMMARY OF THE INVENTION

Achieving of the above-described attributes and functionality is the principal object of the present invention. It is a particular object of the invention to provide a novel methods and apparatus for the transmission of information by radio.

In accordance with the invention, information is transmitted using a single middle channel, a first side channel and a second side channel in a radio system that includes a channel transmitter unit and a channel receiver unit which have been configured to function at a plurality of radio frequencies. In the inventive method, the width of the middle channel frequency band is defined and the widths of the side channel frequency bands are so defined that they are equal to or smaller than the width of the middle channel frequency band. The middle channel is transmitted as a frequency-modulated (FM) radio signal that is created by modulating the middle channel by a suitable frequency. A signal that is symmetrically amplitude-modulated (AM) with respect to the center or mid-frequency of the middle channel is also generated; in other words, the frequency of the carrier wave of the amplitude-modulated signal is substantially the same as the mid-frequency of the middle channel.

The middle wave and the upper single side band of the amplitude-modulated signal are suppressed by taking a sample of the middle wave and the upper single side band, reversing the phase of the sample and summing it with the original amplitude-modulated signal to thereby produce a first amplitude-modulated single side band. A second amplitude-modulated single side band is similarly formed from the amplitude-modulated signal by suppressing the middle wave and the lower single side band by taking a sample of the middle wave and the lower single side band, reversing the phase of the sample and summing it with the original amplitude-modulated signal.

The first single side band is modulated by the information in the first side channel, thus forming two side bands for the first single side band. The second single side band is modulated by the information in the second side channel, thus forming two side bands for the second single side band. The frequency-modulated signal, the first single side band and the second single side band are then combined in a combiner for simultaneous transmission of all three channels.

In a preferred embodiment of the inventive method, the first and second single side bands are transmitted substantially in phase with each other. The middle channel is transmitted in substantially opposite phase relation to the phase of the first and second single side bands.

In accordance with another preferred aspect of the inventive method, an analog signal is transmitted in the middle channel and a digital signal is transmitted in at least one of the side bands.

In another preferred aspect of the inventive method, the carrier frequency used for reception is either the frequency-modulated signal, the first single side band or the second single side band.

In still another preferred aspect of the inventive method, an encryption key code for the middle channel is transmitted in one of the single side bands, the key code allowing an encrypted message to be decrypted.

The inventive apparatus further provides a transmitter unit for the transmission of a middle channel, a first single side band and a second single side band in a radio system. The radio system comprises a channel transmitter unit and a channel receiver unit which have been constructed or configured to function at a plurality of suitable radio frequencies. The transmitter unit includes means for generating a suitable transmission frequency and means for modulating the middle channel into a frequency-modulated (FM) form. The transmitter unit also includes means for generating an amplitude-modulated (AM) signal such that the carrier wave is at the center or mid-frequency of the middle channel. Thus, the carrier waves of the amplitude-modulated and frequency-modulated signals are at substantially the same frequency. The transmitter unit additionally includes means for forming a first and a second single side band from the amplitude-modulated signal, means for modulating the first single side band by the first side channel, means for modulating the second single side band by the second side channel, and means for combining the first single side band, the second single side band and the middle channel for simultaneous transmission.

In a preferred embodiment of the inventive apparatus, the means for forming the first and second single side bands comprises means by which a carrier wave to be suppressed and one of the upper and lower single side bands of the amplitude-modulated signal are substantially reversed in phase and then summed with the amplitude-modulated signal. The transmitter unit preferably includes means for phasing the first and second single side bands so as to make them substantially cophasal. The transmitter unit also preferable includes means for phasing the middle channel so as to make it substantially opposite in phase to the phase of the single side bands.

The present invention advantageously provides for the combination and transmission of three information channels in a single signal, thereby obviating interference between signals. The invention may be utilized to implement an encryption function, as for example one that is appropriate for or required in SafeNet applications, with the side channels being modulated by encryption keys. The inventive apparatus is readily implemented using existing materials and components, and the efforts and procedures required to implement the inventive method are relatively straightforward and simple.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims.

BRIEF DESCRIPTION OF THE DRAWING

The single drawing FIGURE is a block diagram of a transmitter constructed in accordance with a preferred embodiment of the present invention.

DETAILED DESCRIPTION OF THE CURRENTLY PREFERRED EMBODIMENTS

With reference now to the drawing, a transmitter in accordance with the invention includes an oscillator 1 that operatively generates a suitable carrier frequency for a frequency modulator 2 and a single side band generator 3. The carrier is modulated in the frequency modulator 2 by the middle channel information 7 to produce a frequency-modulated (FM) signal.

The single side band generator 3 comprises an amplitude modulator which operatively produces an amplitude-modulated signal from the carrier frequency and a suitable clock frequency 8. The amplitude-modulated signal thus produced is, in the frequency plane, substantially symmetric with respect to the carrier frequency. Two separate side bands are formed from the amplitude-modulated signal. A single side band (SSB) is formed by suppressing the middle carrier wave and the second side band. This suppression is implemented by reversing the phase of a sample taken from the signal and summing it with the original signal, so that the two signals (i.e. the original signal and phase-reversed sample) cancel each other. The resulting first single side band LSB (Lower Side Band) that has been separated from the amplitude-modulated signal is directed to a modulator 4 and the resulting second single side band USB (Upper Side Band) is directed to a modulator 5.

The first single side band LSB is modulated in modulator 4 by the information 10 in the first side channel, and the second single side band USB is modulated in modulator 5 by the information 9 in the second side channel. When the single side band is modulated by the side channel information, two side bands are formed for the single side band.

The frequency-modulated middle channel FM, the modulated first single side band LSB and the modulated second single side band USB are then directed to a combiner 6. The combiner 6 phases the three signals in an appropriate manner and removes any extra modulation results so that the three signals can be transmitted simultaneously. The preferred characteristics of combiner 6 include a large attenuation between all three input ports, a small attenuation out from each input port and a large return loss for all input ports.

The combiner 6 phases the two modulated single side bands USB, LSB so that they are substantially in phase with each other and in opposite phase with respect to the single side bands of the frequency-modulated (FM) signal. The signal 11 to be sent to the preamplifier and transmitting antenna of the transmitter unit thus consists of the frequency-modulated (FM) signal transmitted in the center of the frequency plane and the first and second single side bands LSB, USB transmitted at like spacings from the frequency-modulated signal in the frequency plane.

For reception of the transmitted combined signal, any one of the three signals can be used as a carrier wave. Since the difference between the signal frequencies is known, one signal can be used as a basis for determining the frequencies of the other two. The present invention may be implemented in any number of appropriate frequency ranges for a particular application and, for most uses, as a general matter of design choice.

In preferred forms of the invention, the signals are transmitted in a 25 Hz frequency band divided into five 5-Hz bands. In such an implementation, the order of the frequency bands, from lower to higher frequencies, is as follows: a 5-Hz buffer band for avoiding adjacent band interference, the first single side band LSB, the frequency-modulated middle channel, the second single side band USB, and a second 5-Hz buffer band for avoiding adjacent band interference.

The apparatus of the invention can be implemented using, by way of illustrative example, conventional Gilbert Cells that may be connected as an oscillator, mixer, summer, separator and/or amplifier. A preferred circuit incorporates integrated components for providing the phasing functionality, as for example capacitive and/or inductive components. As will be apparent to those of ordinary skill in the art, in implementing the invention it is necessary to consider slight inaccuracies that result from component tolerances which, in any event, can be eliminated via calibration.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for transmitting information in a radio system using a middle channel, a first side channel and a second side channel each containing information, the radio system including a channel transmitter unit and a channel receiver unit configured to operate at a plurality of radio frequencies, comprising the steps of:

defining a frequency band width of the middle channel;

defining, for each of the first and second side channels, a frequency band width that is no larger than the frequency band width of the middle channel;

using a suitable modulation frequency to frequency modulate the middle channel;

generating an amplitude-modulated signal that is symmetrical with respect to a center frequency of the middle channel and comprising a middle wave, an upper single side band and a lower single side band;

suppressing the middle wave and the upper single side band of the amplitude-modulated signal to generate a first amplitude-modulated single side band (LSB) by taking a sample of the middle wave and the upper single side band, reversing a phase of the sample and summing it with the amplitude-modulated signal;

suppressing the middle wave and the lower single side band of the amplitude-modulated signal to generate a second amplitude-modulated single side band (USB) by taking a sample of the middle wave and the lower single side band, reversing a phase of the sample and summing it with the amplitude-modulated signal;

modulating the first amplitude-modulated single side band (LSB) by the information in the first side channel to form two side bands for the first single side band;

modulating the second amplitude-modulated single side band (USB) by the information in the second side channel to form two side bands for the second single side band; and combining the frequency-modulated middle channel, the modulated first single side band and the modulated second single side band in a combiner for simultaneous transmission of a combined signal comprising the frequency-modulated middle channel and the modulated first and second single side bands.

2. A method in accordance with claim 1, wherein the modulated first and second single side bands of the combined signal are substantially in phase with each other.

3. A method in accordance with claim 2, wherein the frequency-modulated middle channel of the combined signal is in substantially opposite phase relationship to the modulated first and second single side bands of the combined signal.

4. A method in accordance with claim 1, wherein an analog information signal is transmitted in the middle channel and a digital information signal is transmitted in the first and second side channels.

5. A method in accordance with claim 1, wherein the receiver of the channel receiver unit of the radio system uses a carrier wave frequency comprising one of the frequency-modulated middle channel, the first single side band (LSB) and the second single side band (USB).

6. A method in accordance with claim 1, further comprising the step of transmitting an encryption key code for the middle channel on one of the first and second single side bands to permit decrypting of an encrypted message.

7. A channel transmitter unit for transmitting information, in a radio system comprising the channel transmitter unit and a channel receiver unit each configured to operate at a plurality of radio frequencies, using a middle channel, a first side channel and a second side channel, said channel transmitter unit comprising:

means for modulating the middle channel using a suitable modulating frequency to provide a frequency-modulated middle channel;

means for generating an amplitude-modulated signal symmetric about a center frequency of the middle channel;

means for forming a first single side band and a second single side band from the amplitude-modulated signal;

means for modulating the first single side band by the first side channel;

means for modulating the second single side band by the second side channel; and means for combining the frequency-modulated middle channel, the modulated first single side band and the modulated second single side band for simultaneous transmission by the channel transmitter unit of a combined signal comprising the frequency-modulated middle channel and modulated first and second single side bands.

8. A channel transmitter unit in accordance with claim 7, further comprising means for generating the suitable modulating frequency.

9. A channel transmitter unit in accordance with claim 7, wherein the amplitude-modulated signal comprises a middle wave, an upper single side band and a lower single side band, and wherein said means for forming the first and second single side bands comprises means for rendering the middle wave and one of the upper and lower side bands in substantially opposite phase relation to the amplitude-modulated signal and for summing the rendered opposite-phase signals with the amplitude-modulated signal.

10. A channel transmitter unit in accordance with claim 7, further comprising means for phasing the modulated first and second single side bands so as to be substantially cophasal.

11. A channel transmitter unit in accordance with claim 10, further comprising means for phasing the frequency-modulated middle channel so as to be substantially opposite in phase to the first and second single side bands.

* * * * *